United States Patent [19]
Schissler et al.

[11] Patent Number: 5,973,815
[45] Date of Patent: Oct. 26, 1999

[54] SCANNER CARRIAGE LAMP REFLECTOR AND METHOD OF USING SAME

[75] Inventors: Dennis J. Schissler, San Diego; Gerold G. Firl, Poway, both of Calif.

[73] Assignee: Hewlett-Packard Company, Palo Alto, Calif.

[21] Appl. No.: 09/030,321

[22] Filed: Feb. 25, 1998

Related U.S. Application Data

[63] Continuation-in-part of application No. 09/006,312, Jan. 13, 1998.

[51] Int. Cl.[6] .................................................. G02B 26/08
[52] U.S. Cl. ........................... 359/212; 359/196; 362/297
[58] Field of Search ..................... 359/196, 197, 359/223, 227, 224; 362/84, 217, 223, 224, 260, 296–297, 341, 347, 357; 355/67, 69, 113; 358/475

[56] References Cited

U.S. PATENT DOCUMENTS 5,537,240  7/1996  Wun et al. ............................. 359/196

*Primary Examiner*—James Phan
*Attorney, Agent, or Firm*—Jerry R. Potts

[57] ABSTRACT

A screen-printed reflector reflectively redirects light from a scanner bulb in a substantially uniform illumination pattern across a desired scan area of a document to be scanned. A middle or central portion of the reflector is printed with a non-reflective pattern, while the end portions of the reflector are composed of highly reflective polyester textured matte that in combination with the non-reflective pattern substantially equalizes the illumination across the desired scan area of the document being scanned. The manner of using and constructing the screen printed reflector, provides a fast and efficient method for tuning a light distribution profile to provide a sufficient light reflective pattern that compensates for non-uniform light distribution patterns produced by scanner bulbs.

17 Claims, 5 Drawing Sheets

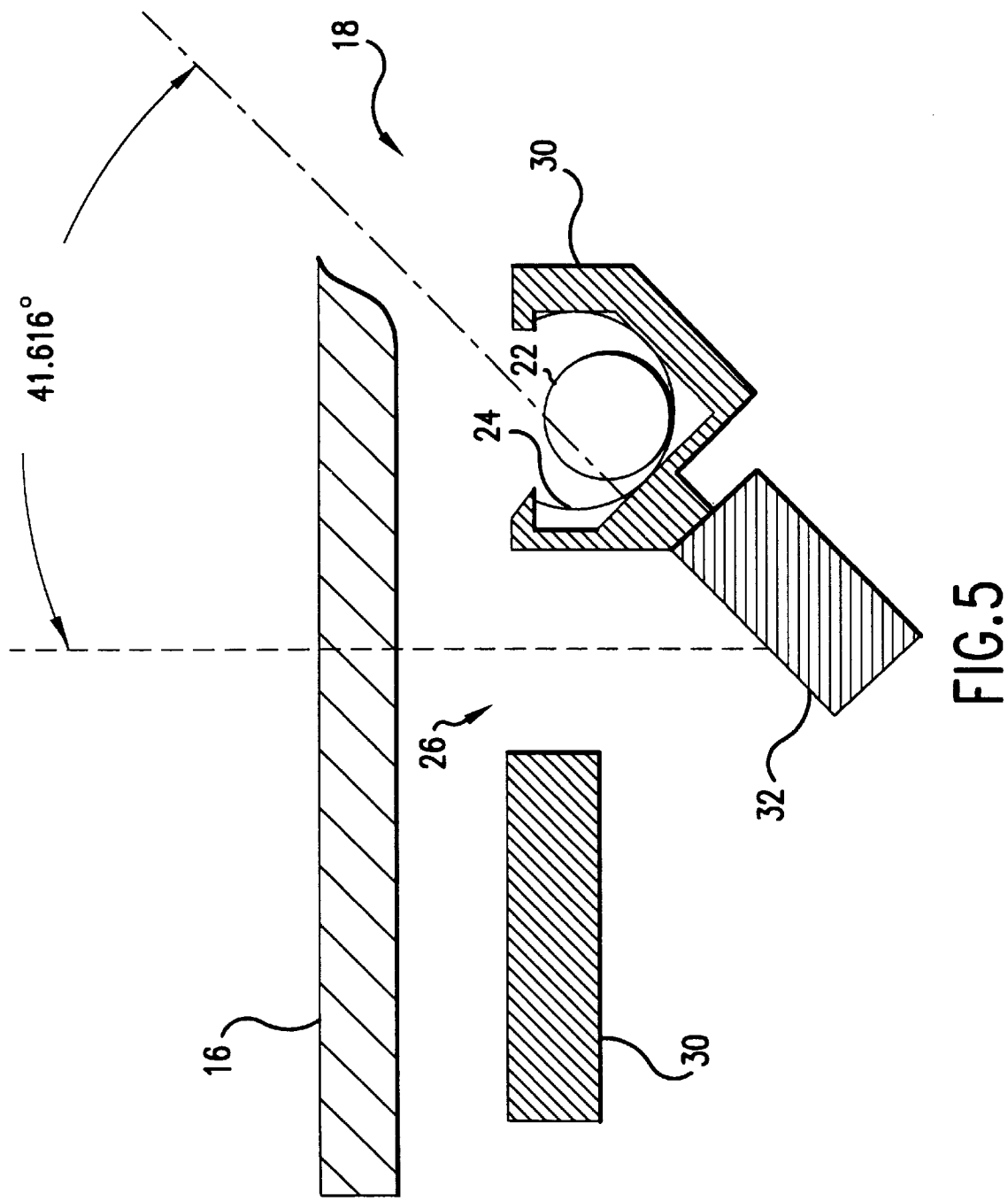

SCANNER CARRIAGE LAMP REFLECTOR AND METHOD OF USING SAME

RELATED APPLICATIONS

This application is a continuation-in-part of U.S. patent application Ser. No. 09/006,312, filed on Jan. 13, 1998, entitled "SCANNER CARRIAGE MIRROR MOUNTING TO REDUCE FOOTPRINT".

TECHNICAL FIELD

The present invention relates generally to document scanners and, more specifically, to the mounting of a lamp reflector in a scanner carriage for illuminating a document to be scanned and a method of using the reflector for substantially eliminating or at least greatly reducing irregularities or non-uniformity in document illumination.

BACKGROUND OF THE INVENTION AND PRIOR ART

A document scanner ordinarily employs a traveling scanner carriage in which a scanner lamp is mounted for illuminating a document to be scanned. As is well known, reflectors are also typically mounted on the carriage adjacent to the lamp for helping to increase the amount of light projected by the scanner lamp onto the area of the document being scanned.

One of the problems associated with scanning such a document is the non-uniformity of the illumination levels across the document being scanned. In this regard, the amount of light at the marginal edges of the document is always less that the illumination levels at about the center of the document. As a result of this non-uniformity, the excessive illumination levels at the center of the document may cause undesired and unwanted saturation of the translational devices utilized to convert detected light into an associated electrical signal. Alternatively the irregular illumination pattern may cause such a translation device to have such a low signal to noise ratio that a significant loss of resolution results in the less illuminated areas of the document.

Therefore it would be highly desirable to have a new and improved method and light reflection device that enables the light distribution pattern across a document being scanned to be uniformly illuminated substantially from edge to edge.

One attempt at seeking to provide a uniform document illumination area has been to utilize a separate light dispersion device with a preformed aperture that is oriented above the scanner lamp. In order to control the light reflected onto the document, the aperture is configured to be wider at its end portions and narrower at its center to provide what is commonly called a "dog bone" illumination profile.

While the use of such a separate light dispersion device has been found to be satisfactory for some applications, such a device utilizes unnecessary space and substantially increases manufacturing costs and assembly time.

Therefore it would be highly desirable to have such a new and improved method and light reflection device that does not increase manufacturing costs and assembly time unnecessarily nor require the utilization of additional space.

Another attempt at seeking to provide a uniform document illumination area has been to employ the use of additional reflectors at about the end portions of the scanner lamp in a stop field opposite from the scanner lamp. Again, while the use of such additional reflector may help to uniformly disperse the illumination from the scanner lamp, the increased costs and space requirements associated with such additional reflectors has not been entirely satisfactory.

Therefore it would be highly desireable to have such a new and improved apparatus and method of light dispersion that provides a uniform document illumination area without the need of additional reflectors.

SUMMARY OF THE INVENTION

In the preferred embodiment of the present invention, a new and improved scanner carriage unit includes a lamp/reflector arrangement that enables a scanned document to be uniformly illuminated across a desired scan area in a relative inexpensive manner.

In accordance with another preferred embodiment of the present invention, a new and improved screen-printed reflector reflectively redirects light from a scanner bulb in a substantially uniform illumination pattern across a desired scan area of a document to be scanned. A middle or central portion of the reflector is printed with a non reflective pattern, while the end portions of the reflector are composed of a highly reflective polyester textured matte that in combination with the non-reflective screen-print patterns substantially equalizes the illumination across the desired scan area of the document being scanned.

In accordance with still yet another preferred embodiment of the present invention, a novel method of using and constructing the screen printed reflector, provides a fast and efficient method for timing a light distribution profile to facilitate compensating for the non uniform light distribution patterns produced by different types of scanner bulbs.

BRIEF DESCRIPTION OF THE DRAWINGS

The above mentioned features of the preferred embodiment of the present invention and the manner of attaining them will become apparent, and the invention itself will be best understood by reference to the following description of the embodiment of the invention in conjunction with the accompanying drawings, wherein:

FIG. 5 is an enlarged cross-sectional view of the lamp/reflector assembly of FIG. 1.

DESCRIPTION OF THE PREFERRED EMBODIMENT

Figure 1:
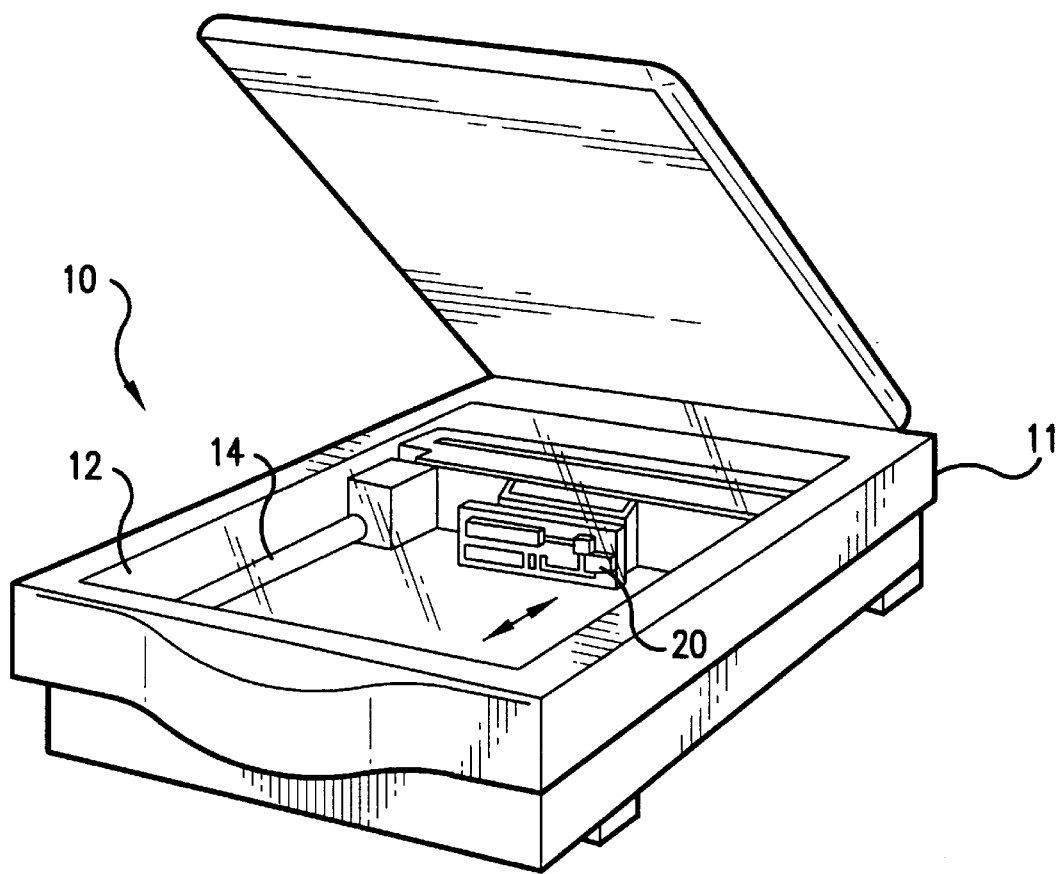
FIG. 1 is perspective view of a document scanner that is constructed in accordance with a preferred embodiment of the present invention.
Figure 2:
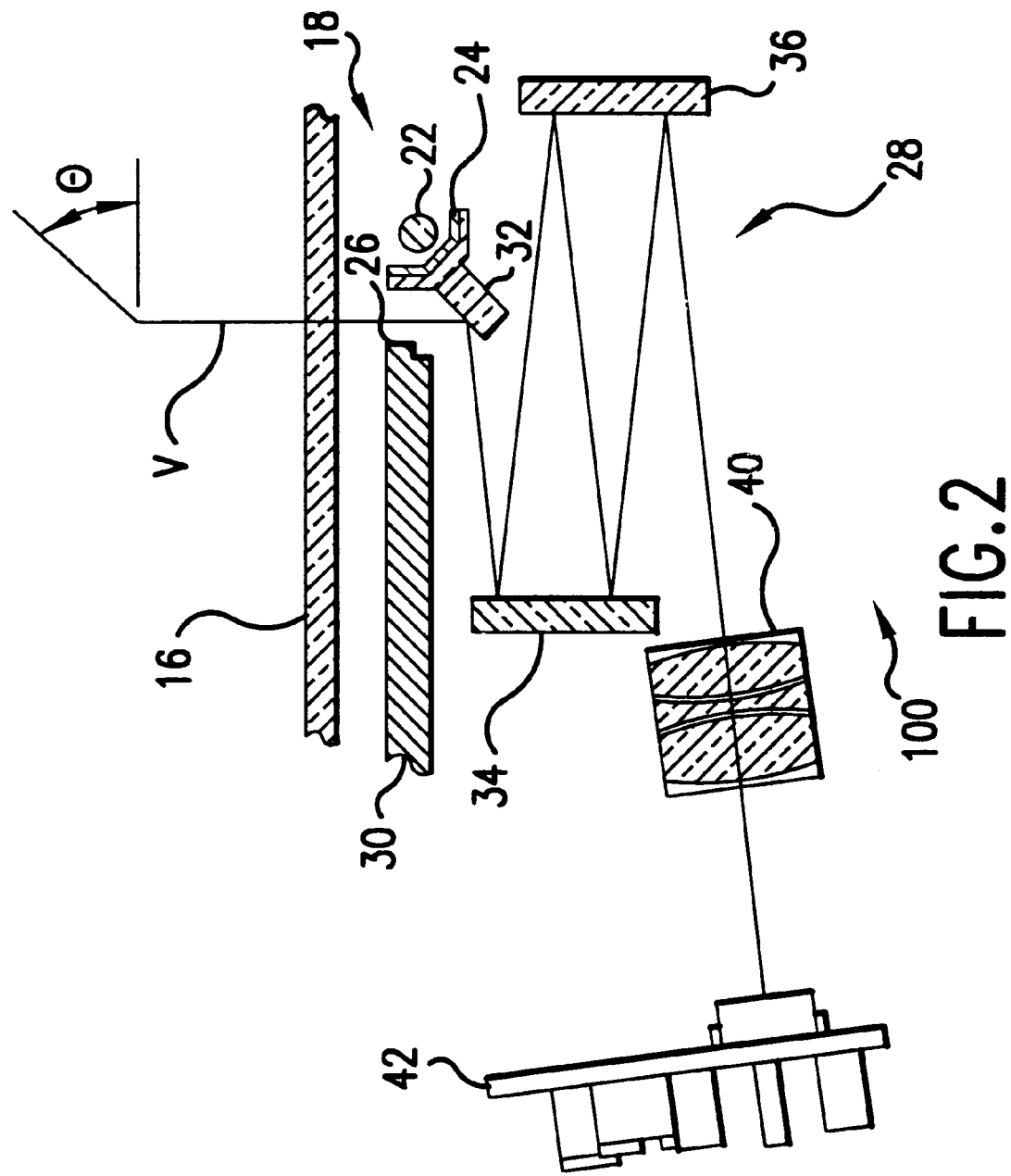
FIG. 2 is a fragmentary cross sectional elevation view showing a folded optical path defined by a set of mirrors in a scanner carriage of FIG. 1.

Referring now to the drawings and more particularly to FIGS. 1–2 thereof, there is shown a scanner 10 that is constructed in accordance with the preferred embodiment of the present invention. The scanner 10 is utilized in a computer system (not shown) for acquiring image and textual information from a hardcopy document, such as a document 16 for subsequent storage and retrieval on an as needed basis.

The scanner 10 generally includes a small footprint housing 11 having mounted therein on a guide or slide rod 14 for rectilinear movement a scanner carriage unit 20. The carriage unit 20 is mounted below a transparent platform surface or window 12 that supports from below a document to be scanned, such as the document 16. In order to illuminate the document 16 with a sufficient amount of light for image and textual pickup purposes, the carriage unit 20 includes a lamp and reflector arrangement 18 that will be described hereinafter in greater detail. The lamp and reflector arrangement 18 illuminate a field of view scanning area defined on the window 12.

As best seen in FIG. 2, the lamp and reflector arrangement 18 generally includes a high intensity lamp 22 and a screen-printed reflector 24. The lamp 22 and reflector 24 are mounted to the carriage unit 20 for reflecting distributed light upwardly through the transparent window 12 onto the document 16 when its positioned in the field of view scanning area. In order to confine the light to a desired area on the document 16, the carriage unit 20 includes a cover 30 having an elongated lamp/reflector-receiving groove 25 and a field stop or slot 26. The groove 25 is disposed adjacent to and rearwardly of the stop 26. The groove 25 is generally V-shaped and has a sufficient overall dimension for receiving therein the reflector 24. A set of small spaced apart protuberances (not shown) are disposed along and near the upper wall edges of the groove 25 for engaging and holding the reflector 24 at its peripheral edges within the groove 25.

The groove 25 also has a sufficient length to receive a set of connectors (not shown) for facilitating the interconnection of the lamp 22 to an electrical power supply (not shown). The V-shape of the groove 25 enables light from the reflector 24 to be strongly reflected in a forward scanning direction toward a vertical plane (V) extending through the slot 26. In this regard, when the reflector 24 is mounted within the groove 25, the reflector 24 causes light from lamp 22 to be reflected forwardly in the same scanning direction traveled by the carriage unit 20. The reflected light is in the form of a wide beam of sufficient dimension to radiate across the entire horizontal dimension of the defined field of view scanning area defined within the window 12. This wide beam of light travels with the carriage unit 20 to scan across the document 16 when it is positioned in the field of view scanning area.

The area of the document illuminated by the beam of light reflecting from the reflector 24 is defined as a document illumination area. The document illumination area has a sufficient dimension to permit light from the document 16 to be reflected downwardly where it impinges upon a charge coupled device (CCD) 42 via a mirror assembly 28 mounted within the scanner housing 11. The mirror assembly 28 will be described hereinafter in greater detail.

Figure 3:
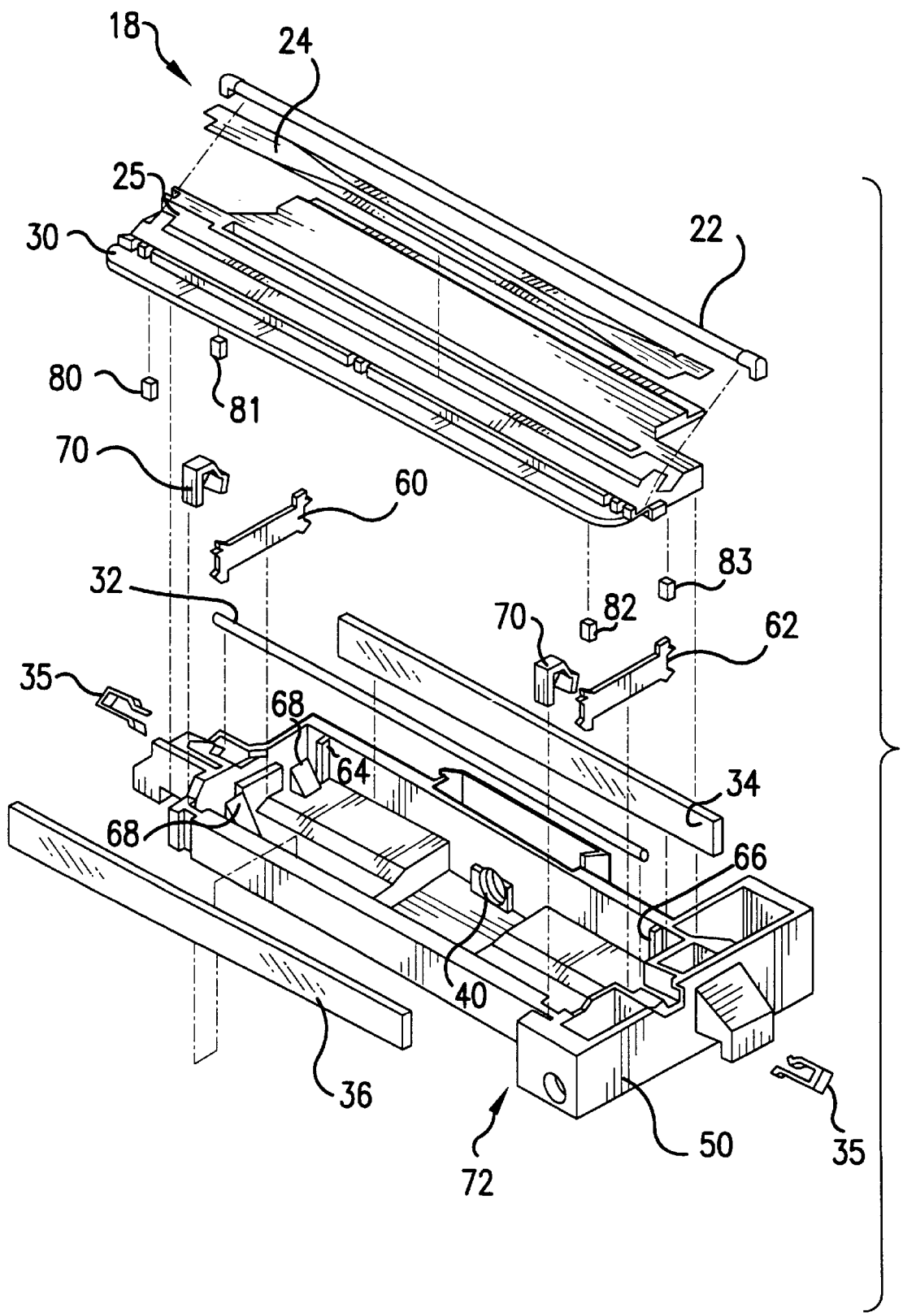
FIG. 3 is an exploded perspective view of the scanner carriage of FIG. 1.
Figure 4:
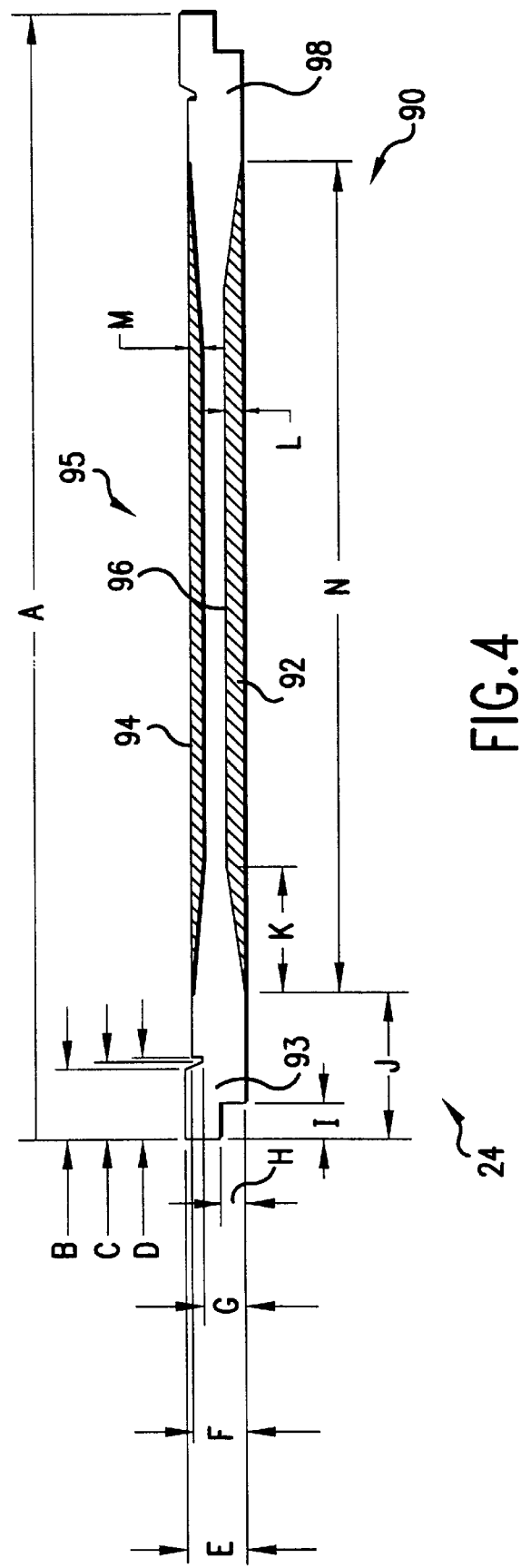
FIG. 4 is a plane view of a light reflector provided in the scanner carriage of FIG. 3.

Considering now the lamp and reflector arrangement 18 in greater detail with reference to FIGS. 2–4, the lamp 22 has an elongated tube-like structure that emits a much brighter light at about its center than at about its end portions. In this regard, the light emitted by the lamp 22 is unable to uniformly illuminate a document being scanned, such as the document 16.

In order to eliminate the problem associated with too much light illuminating a center portion of a document being scanned and too little light illuminating its end portions, the reflector 24 is mounted below the lamp 22 and rearwardly of the field stop 26. The reflector 24 is configured in such a manner so its end portions reflect a sufficient amount of light to properly illuminate the end portions of the document 16. Simultaneously, the center portion of the reflector 24 is configured to reduce the amount of light reflected to illuminate the center portion of the document 16. In this regard, the reflector 24 is screen printed with a desired illumination control pattern 90 (FIG. 4) that enables the light reflecting from the reflector 24 to brightly illuminate the end portions of the document illumination area and to more dimly illuminate the center portion of the document illumination area.

Considering now the reflector 24 in greater detail with reference to FIGS. 3–4, the reflector 24 is composed of a bright reflective polyester material having a matte texture on its upper surface that uniformly reflects light. The polyester material has a substantially bright reflective color, such as a white color, to facilitate reflecting light. The reflector 24 is further configured so that it is wider at its ends indicated generally at 93 and 98 than at its center, indicated generally at 95.

To facilitate controlling the amount of light reflecting from the center and end portions of the reflector 24, a pair of elongated non-reflective strips 92, 94 are screen printed at about and adjacent to the central edge areas of the upper surface of the reflector 24. The overall length of the strips 92 and 94 is less than the overall length of the lamp 22 and the reflector 24 so that each end portion of the reflector 24 has an enlarged white reflective surface area of sufficient dimension to strongly reflect the weaker or dimmer light emitting from the end portions of the lamp 22.

In order to reduce the amount of light reflecting from the center portion 95 of the reflector 24, the overall width of each of the strips 92, 94 are sufficiently wide to limit the white reflective surface area in the center of the reflector 24. In this regard, while the center portion 95 of the reflector 24 facilitates the reflecting of a sufficient amount of light to properly illuminate the center portion of the document illumination area, the non-reflective strips 92 and 94 in combination are sufficiently wide to substantially limit the amount of reflected light to prevent light from saturating or over illuminating the center portion of the document illumination area.

To control the amount of light reflecting from the surface of the reflector 24 so that the reflected light area gradually increases from the center of the reflector 24 toward its outer end portions, the screen-printed non-reflective surfaces 92 and 94 are tapered at their respective ends. In this regard, greater areas of the white reflective surface of the reflector 24 are gradually exposed along a path from the center of the reflector 24 towards its outer end portions.

To further control the amount of light reflecting from the center portion of the reflector 24, the non-reflective strip 92 is substantially wider than the non-reflective strip 94 throughout a substantial portion of its overall length. The reflector 24 is mounted in the groove 25 so that the strip 92 is disposed further from the slot 26 than the strip 94. In this manner, the amount of light illuminating the center portion of the document illumination area is sufficiently controlled to prevent saturation as mentioned earlier.

From the foregoing it should be understood by those skilled in the art, that the non-reflective strips 92 and 94 sandwich a small center portion of the reflective surface indicated generally at 96. In a similar manner, the larger white reflective surface end portions, indicated generally at 93 and 98 respectively, sandwich the non-reflective strips 92 and 94. This overall configuration of reflective surfaces and non-reflective surfaces substantially equalizes the illumination across the document illumination area so that the excess light emitted from the center of the lamp 22 is attenuated reflectively, while the dimmer light emitted from the end portions of the lamp 22 is maximized refectively to substantially prevent loss of resolution at the end portions of the document 16.

It should also be understood by those skilled in the art, that the use of a screen-printed reflector, such as the reflector 24, enables an exact light distribution across a document to be easily tuned by changing the print pattern of the non-reflective strips 92 and 94. No additional parts are required, no additional space is required, and the cost of manufacture is relatively inexpensive. Accordingly, the preferred embodiment of the present invention is particularly advantageous during a product development phase where various kinds of light distributions can be easily tested without changing the overall physical dimensions of the reflector 24. Moreover, the simple changing of the screen printed non-reflective patterns enables the reflector 243 well suited for low cost mass production manufacturing since screen printing is very inexpensive and the use of a flexible polyester reflective strip allows fabrication in a shape which is convenient for assembly will still providing a highly effective manner of controlling light distribution over a desired document illumination area.

Table 1 provides the preferred dimensions of the reflector 24 as illustrated in FIG. 4:

TABLE I

REFLECTOR DIMENSIONS

| DESIGNATIONS | LENGTH IN MILLIMETERS |
|---|---|
| A | 270.0 |
| B | 17.0 |
| C | 19.0 |
| D | 20.0 |
| E | 2 × 14.7 |
| F | 13.0 |
| G | 2 × 11.0 |
| H | 2 × 6.7 |
| I | 8.8 |
| J | 35.0 |
| K | 30.0 |
| L | 4.5 |
| M | 2.5 |
| N | 2 × 200.0 |

Considering now the mirror assembly 28 in greater detail with reference to FIGS. 2 and 3, the mirror assembly 28 generally includes a narrow mirror 32 that is mounted at an angle θ relative to the horizontal plane of the window 12. In this regard, the mirror 32 permits light reflecting from the document 16 to travel downwardly along an irregularly shaped light path, indicated generally at 100 to the CCD 42. The mirror assembly 28 also includes a pair of spaced apart mirrors including a wide upper mirror 34, and a wide lower mirror 36. The mirrors 34, and 36 are mounted in the light path 100 in order to permit the light reflecting from the document 16 to be reflected to the CCD 42. A lens assembly 40 also mounted in the light path 100 cooperates with the mirrors 34 and 36 to focus the light reflecting from the document 16 onto the circuits of the CCD 42 for image processing purposes.

Considering now the scanner carriage 20 in greater detail with reference to FIG. 3, the carriage 20 generally includes a molded plastic chassis 50 and cover 30. The cover 30 is affixed to the chassis 50 by screws to form a carriage housing in which the mirrors 34 and 36 are positional mounted. The angled narrow mirror 32 is directly attached to the housing chassis 50 and held in place by spring clips 35. The upper and lower mirrors 34 and 36 respectively, are not directly connected to the chassis 50 but instead are maintained in precise spaced parallel relationship to each other by a pair of spaced flat sheet metal spacer plates 60 and 62. The spacer plates 60, 62 are disposed oppositely from one another facing the image plane sides of the respective mirrors 34 and 36.

As best seen in FIG. 3, the upper mirror 34 engages spaced vertically extending rails 64, 66 which are molded on an interior wall of the chassis 50 on opposite sides of the lens assembly 40. Grooves in which the spacer plates 60, 62 are free to float or move in directions normal to the image planes of the upper and lower mirrors 34 and 36 respectively. As shown in FIG. 2, the spacer plate grooves are defined by inside sidewalls of the chassis 50 and by abutments, such as the abutments 68 molded on the floor of the chassis 50.

One of the two parallel mirrors 34, 36 is mounted at a slightly higher elevation in the chassis 50 so that the folded optical path 100 shown in FIG. 2 is maintained. A pair of spaced identical sheet metal leaf springs 70 are received in slots, such as the slot 72, formed in the chassis 50 and urge the lower mirror 36 to the right and into engagement with the spacer plates 60, 62. The spacer plates 60 and 62 are likewise urged to the right into firm engagement with the upper mirror 34. In a like manner, the upper mirror 34 is urged against the rails 64, and 66 to maintain the entire mirror assembly in precise position, spacing and parallelism relative to the chassis 50.

The underside of the housing cover 30 is preferably molded with spaced apertures which receive four elastomeric compressible pads 80, 81, 82, 83. The pads 80, 81, 82, and 83 are positioned as shown in FIGS. 3 and 4 which, when the cover 30 is screwed onto the chassis 50, partially compress and engage an upper edge of the upper mirror 34 and the spacer plates 60, 62. In this manner, the pads 80, 81, 82, and 83 are firmly affixed in their required position without the need of affixation screws or spring clips or the equivalent.

The first and second elastomeric pads 81, 83 engage both an upper side edge of the upper mirror 34 as well as an upper edge of the respective spacer plates 60, 62 at locations proximate their points of contact with the upper mirror.

The third and fourth elastomeric pads 80, 82 engage the upper edges of the spacer plates 60, 62 proximate the points of contact of the spacer plates with the lower mirror 36 but do not engage the lower mirror 36 itself. Preferably, the spacer plates 60, 62 are identical with each other and are formed from flat pieces of sheet metal and have upper and lower projecting fingers 64, 65, 66, 67 at the opposite mirror-engaging edges which contact the upper and lower mirrors on the facing image plane sides thereof. By virtue of the fact that the spacer plates 60, 62 can be substantially identical sheet metal parts as can the biasing springs 70, 72, economies of manufacture and assembly result.

It should be noted that the spacer plates 60, and 62 are freely movable with respect to the chassis 50 in spaced paths that intersect the image planes of the mirrors. It should also be note that the springs 70 do not contact the image plane sides of the mirrors 34, and 36 whereby the image plane sides are substantially unobstructed except for the points of contact with the spacer plates 60 and 62. This enables the scanner carriage 20 to occupy a relatively small footprint and enable use of a larger portion of the mirrors 34 and 36 than otherwise possible.

As shown, the spacer plates 60, 62 are free to move in and occupy spaced planes which are normal to the image planes of the mirrors 34, and 36. It should be noted however, other arrangements in which the planes of the spacer plates 60, 62 are not necessarily normal to the image planes of the mirrors and arrangements in which the spacer plates 60, 62 are not parallel to each other are contemplated.

Affixation of the cover 30 to the housing by screws compresses the resilient pads 80–83 into engagement with the upper side edge of the upper mirror 34 and with the spacer plates 60, 62 at the positions shown. In this manner the mirrors 34 and 36 are maintained in precise spaced parallel relationship, even in the occurrence of substantial shock or vibration of the device during shipment or use.

Although spaced elastomeric pads 81, 83 are shown contacting the upper mirror and spacer plates, a single elastomeric compressible pad which extends substantially the full length of the upper mirror is also contemplated.

While particular embodiments of the present invention have been disclosed, it is to be understood that various different modifications are possible and are contemplated within the true spirit and scope of the appended claims. There is no intention therefore, of limitation to the exact abstract or disclosure herein presented.

We claim:

1. A carriage unit having a cover with an elongated slot disposed therein, said slot having a sufficient length to extend across an entire horizontal dimension of a defined field of view scanning area and a sufficient width to define a document illumination area within the defined field of view scanning area and a housing having an elongated groove disposed adjacent and opposite said elongated slot, said groove having another sufficient length to extend across the entire horizontal dimension of the defined field of view scanning area, comprising:

a high intensity lamp having a central portion sandwiched between a pair of end portions and being mounted above said groove for illuminating the document illumination area;

said lamp providing bright intensity light at about its central portion and a substantially dimmer intensity light at about its end portions;

a flexible reflector disposed within the groove for reflecting light from said lamp forwardly to illuminate the document illumination area and for substantially equalizing the distribution of light across the entire document illumination area;

a pair of spaced apart reflective end portions for strongly reflecting the dimmer intensity light at about the end portions of said lamp;

an elongated narrow reflective center portion sandwiched between a pair of elongated non reflective center portions for weakly reflecting the bright intensity light at about the central portion of said lamp;

wherein said elongated reflective central portion is contiguous with said pair of reflective end portions; and wherein one of said non-reflective elongated center portions is substantially narrower than the other one of said non-reflective elongated center portions.

2. A carriage unit according to claim 1, wherein said reflective center portion is substantially wider than either one of said nonreflective center portions.

3. A carriage unit according to claim 2, wherein each non-reflective center portion includes a wide center portion sandwiched between a pair of narrow end portions.

4. A carriage unit according to claim 3, wherein each of said reflective end portions is substantially wider than said reflective center portion.

5. A scanner carriage unit, comprising:

a housing mounted for rectilinear movement relative to a document receiving area;

a reflector mounted within said housing for facilitating the illumination of a sheet of indicia bearing material disposed at said document receiving area with reflected light having a substantially even distribution across a given portion of said sheet;

said reflector having an elongated reflective strip sandwiched between a pair of elongated non reflective strips; and wherein one of said non reflective strips is substantially narrower at about its center portion than the other one of said non-reflective strips is about its center portion.

6. A scanner carriage unit according to claim 5, wherein said reflective strip includes:

a pair of spaced apart reflective end portions for strongly reflecting dimmer intensity light; and an elongated narrow reflective center portion sandwiched between center portions of respective ones of said pair of elongated non reflective strips for weakly reflecting bright intensity light.

7. A scanner carriage unit according to claim 6, wherein said elongated reflective center portion is contiguous with said pair of relective end portions.

8. A scanner carriage unit according to claim 6 wherein said housing includes:

a cover having an elongated slot, said slot having a sufficient length to extend across an entire horizontal dimension of a defined feld of view scanning area and a sufficient width to define a document illumination area within the defined field of view scanning area; and an elongated groove disposed adjacent and opposite said elongated slot, said groove having another sufficient length to extend across the entire horizontal dimension of the defined field of view scanning area.

9. A scanner carriage unit according to claim 8 further comprising:

a high intensity lamp having a central portion sandwiched between a pair of end portions and being mounted above said groove for illuminating the document illumination area;

said lamp providing bright intensity light at about its central portion and a substantially dimmer intensity light at about its end portions; and wherein said reflector redirects the bright intensity light and said dimmer intensity light in a substantially equalizes distribution across the entire horizontal dimension of the defined field of view scanning area.

10. A scanner carriage unit according to claim 6, wherein said reflective center portion is substantially wider than either one of said non-reflective center portions.

11. A scanner carriage unit according to claim 10, wherein each non-reflective center portion includes a wide center portion sandwiched between a pair of narrow end portions.

12. A scanner carriage unit according to claim 11, wherein each of said reflective end portions is substantially wider than said refective center portion.

13. A scanner carriage unit according to claim 5, wherein said reflector is composed of a refective polyester material.

14. A scanner carriage unit according to claim 13, wherein said polyester material is matte textured on one of its sides.

15. A scanner carriage unit according to claim 13, wherein the relective polyester material is a white reflective polyester material throughout its entire length.

16. A scanner carriage unit according to claim 5, wherein said reflector is flexible.

17. A scanner carriage unit according to claim 5, wherein each of said pair of non-reflective center portions is a screen print black center portion.

* * * * *

UNITED STATES PATENT AND TRADEMARK OFFICE
CERTIFICATE OF CORRECTION

PATENT NO    : 5,973,815

DATED        : October 26, 1999

INVENTOR(S)  : Schissler, et al.

It is certified that error appears in the above-identified patent and that said Letters Patent is hereby corrected as shown below:

At column 2, line 27, after "method for", delete "timing" and insert in lieu thereof --tuning--.
At column 8, line 53, after "said" delete "refective" and insert in lieu thereof --reflective--.
At column 8, line 55, after "of a", delete "refective" and insert in lieu thereof --reflective--.

Signed and Sealed this

Fourth Day of July, 2000

Attest:

Q. TODD DICKINSON

Attesting Officer        Director of Patents and Trademarks